United States Patent [19]
Connell

[11] Patent Number: 4,610,009
[45] Date of Patent: Sep. 2, 1986

[54] WRITING, ERASING AND READOUT SYSTEM FOR A MAGNETO-OPTIC RECORDING MEDIUM

[75] Inventor: G. A. Neville Connell, Cupertino, Calif.

[73] Assignee: Xerox Corporation, Stamford, Conn.

[21] Appl. No.: 497,325

[22] Filed: May 23, 1983

[51] Int. Cl.$^4$ .............................................. G11B 13/04
[52] U.S. Cl. ..................................... 369/110; 369/14; 360/114
[58] Field of Search ...................... 369/110, 13, 14, 15, 369/59; 365/122, 215, 234; 360/114

[56] References Cited

FOREIGN PATENT DOCUMENTS

| 57-53801 | 3/1982 | Japan | 360/114 |
| 58-57646 | 4/1983 | Japan | 360/114 |
| 2101792 | 1/1983 | United Kingdom | 369/13 |

Primary Examiner—Donald McElheny, Jr.
Attorney, Agent, or Firm—Serge Abend

[57] ABSTRACT

A writing, erasing and readout system for a magneto-optic recording medium capable of achieving switching rates approaching the laser pulse rate, including plural diode lasers operating through a single optical path and cooperating with bi-polar magnetic field producing means located adjacent to and on the opposite side of the magneto-optic medium.

20 Claims, 13 Drawing Figures

# WRITING, ERASING AND READOUT SYSTEM FOR A MAGNETO-OPTIC RECORDING MEDIUM

This invention relates to an improved writing, erasing and readout system for a magneto-optic recording medium wherein plural diode lasers operating through a single optical path cooperate with bi-polar magnetic field producing means located adjacent to and on the opposite side of the magneto-optic medium.

BACKGROUND OF THE INVENTION

Digital optical disks are capable of storing substantially greater amounts of information than conventional commercially available magnetic disk memories of comparable size. However, the presently commercially available digital optical disks are of the write-once type. These utilize a permanently deformable recording medium such as, for example, an ablatable material, wherein a high intensity laser write beam opens small holes in a threshold modifiable film coated upon a suitable substrate. Erasure is not possible.

Erasable digital magnetic disks, of the known commercially available variety, utilize magnetic medium wherein the film magnetization exhibits in-plane anisotropy. In view of the larger amount of real estate needed for each bit of information, it is clear that the stored information capacity would not be as large as that achievable with a system and medium capable of recording by means of perpendicular anisotropy.

The present invention relates to a system for writing, erasing and reading information upon a magneto-optic recording medium exhibiting perpendicular anisotropy. This means that when the portion of the medium in the information domain is heated to a sufficiently high temperature (as by exposure to a laser spot) in the presence of a magnetic field in the direction normal to the medium, the heated spots are caused to be oriented in the direction of lines of force in the magnetic field. Magnetization may be either in the UP direction or the DOWN direction, in accordance with the direction of the field lines passing therethrough. When this process is practiced with a gas laser, diffraction gratings have been required to create plural usable side-by-side spots, because of the large size of their optical output. Consequently, this has necessitated complex optics. With the advent of diode lasers of sufficient power output, it has been possible to direct usable closely spaced spots on the magneto-optic media through a single optical path. Such known systems have required precise alignment of the spatial relationship of the lasers, one to the other, in order to focus the plural spots through the same optical path.

It is now possible to build any number of diode lasers side-by-side on a chip. Thus, the lasers will be properly aligned as manufactured and the single optical path may be simplified. Most of the advantages of such a two laser system are achieved with no cost impact on the optics and a significant reduction in alignment problems. In U.S. Pat. No. 4,517,667, granted May 14, 1985, entitled "Direct Read After Write Optical Disk System", assigned to the same assignee as the instant application, Sprague describes a write-once recording and reading system, incorporating a single optical path, for use with a dual laser combined in a single package.

SUMMARY OF THE INVENTION

It would be highly desirable to utilize a similar optical system and dual laser array in a reusable magneto-optic environment wherein the recording and erasing of information could be accomplished reliably, rapidly and accurately. Therefore, it is an object of this invention to associate each laser spot with a magnetic pole piece of opposite polarity, so that it will be possible to record and erase information on magneto-optic media in a manner which will obviate the necessity for switching the magnetic field. To this end, the present invention may be practiced, in one form, by providing a magneto-optic recording apparatus capable of writing, erasing and reading information on a magneto-optic recording medium having a number of tracks. The apparatus includes a plual laser array, each laser of which being selectively and independently addressable for generating different output energy laser beams and a single optical system interposed between the plural laser array and the magneto-optic recording medium. A magnetic device, located on the side of said medium opposite to the optical system, includes spaced pole pieces of opposite polarity positioned adjacent the recording medium with one of the lasers being associated with one of the pole pieces and another of the lasers being associated with the other of the pole pieces.

BRIEF DESCRIPTION OF THE DRAWINGS

Other objects and advantages of the present invention will be clear from the following description and claims taken with the accompanying drawings, wherein:

DESCRIPTION OF THE PREFERRED EMBODIMENTS

Figure 1:
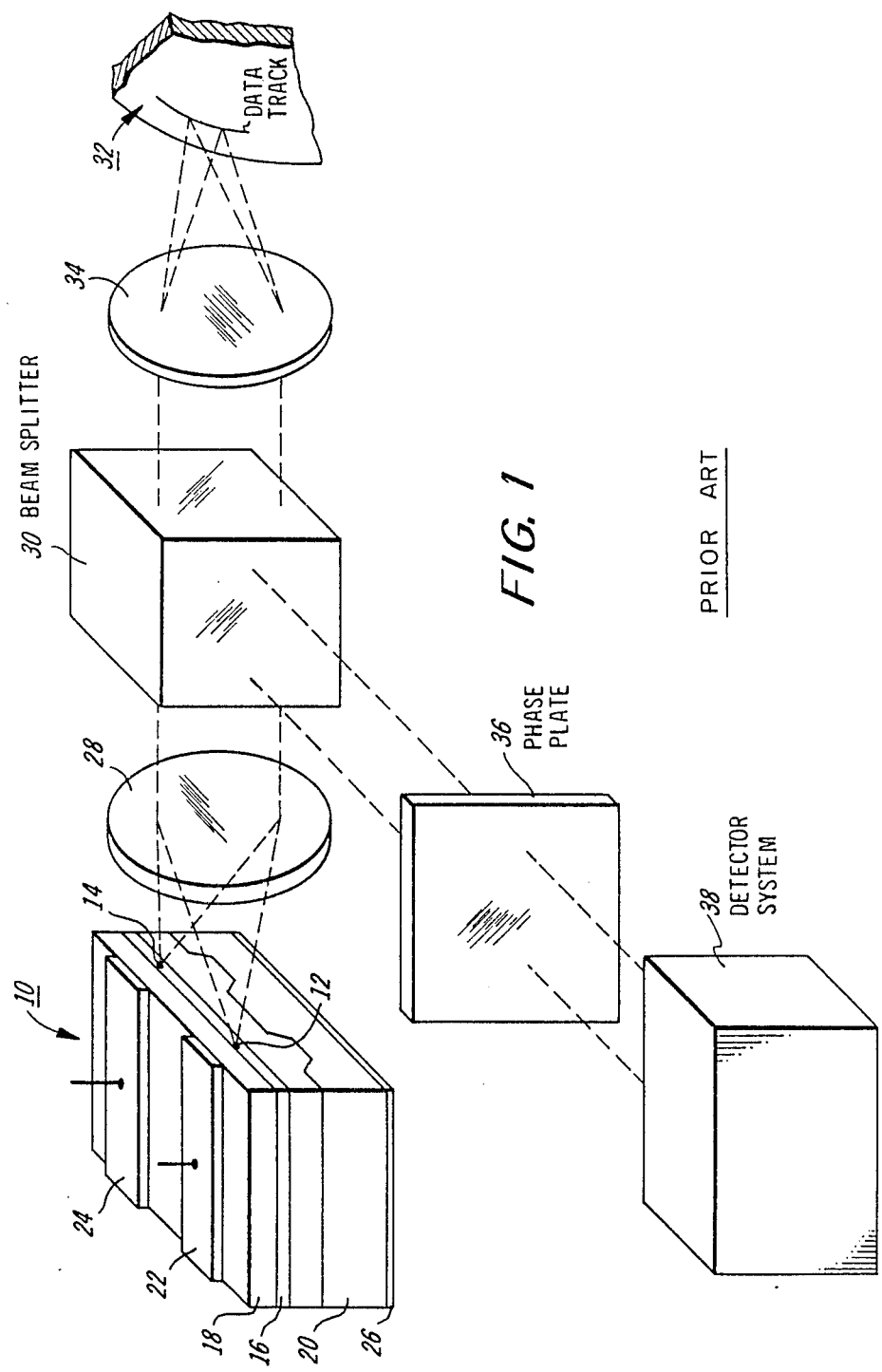
FIG. 1 is a perspective view of a known magneto-optic recording system using a plural diode laser array.

The magneto-optic system of this invention, as illustrated in FIG. 1, incudes a linear diode laser array 10 comprised of a pair of injection diode lasers 12 and 14 manufactured on a single chip. The lasers may be of any conventional solid state type. Although only two lasers are shown, it should be understood that the array may include any number. For example, for tracking purposes, three lasers may be made side-by-side to provide three spots aligned along a single track; if it is desired to write simultaneously upon adjacent tracks, an array may be configured having plural lasers disposed transversly to those shown in FIG. 1. Of course, it is possible to construct a matrix comprising plural lasers in the in-track direction and plural lasers in the cross-track direction.

A channeled substrate design, as illustrated, provides light from an active layer 16 sandwiched between cladding layers 18 and 20. Each of the lasers 12 and 14 has its own current driver provided by suitable electrodes 22 and 24 acting in conjunction with a substrate electrode 26, in order that either laser may be driven selectively and independently by its data signal. In this way, the duration of the drive and its energy level may selectively result in either a pulsed or continuous wave output, and may generate a high intensity write or erase beam or a low intensity read beam.

The lasers, being fabricated as a single unit may be closely spaced and could have a separation of about 100 microns. Because of their close spacing a common optical path may be used for both beams. Accordingly, the optical path for the two laser beams includes a collector lens 28 for collimating the diverging laser beams, a polarizing beam splitter 30 for passing a major portion of the laser optical energy to a recording medium 32 and an objective lens 34 for focusing the collimated beams upon the recording medium. Beams reflecting off the recording medium are redirected by the beam splitter 30 through a phase plate 36 to a suitable detector system 38. The detector system would be used to provide readback data from the recording medium as well as for focusing and tracking in the "read" mode. In order to sharply focus the beams, the objective lens 34 can be moved back and forth relative to the medium by a servo-controlled voice coil 39 (shown in FIG. 2), or other suitable means. Other magnetic means (not shown) is also located on opposite sides of the lens 34, in the same plane as the voice coil, for moving the lens laterally, for tracking.

Figure 2:
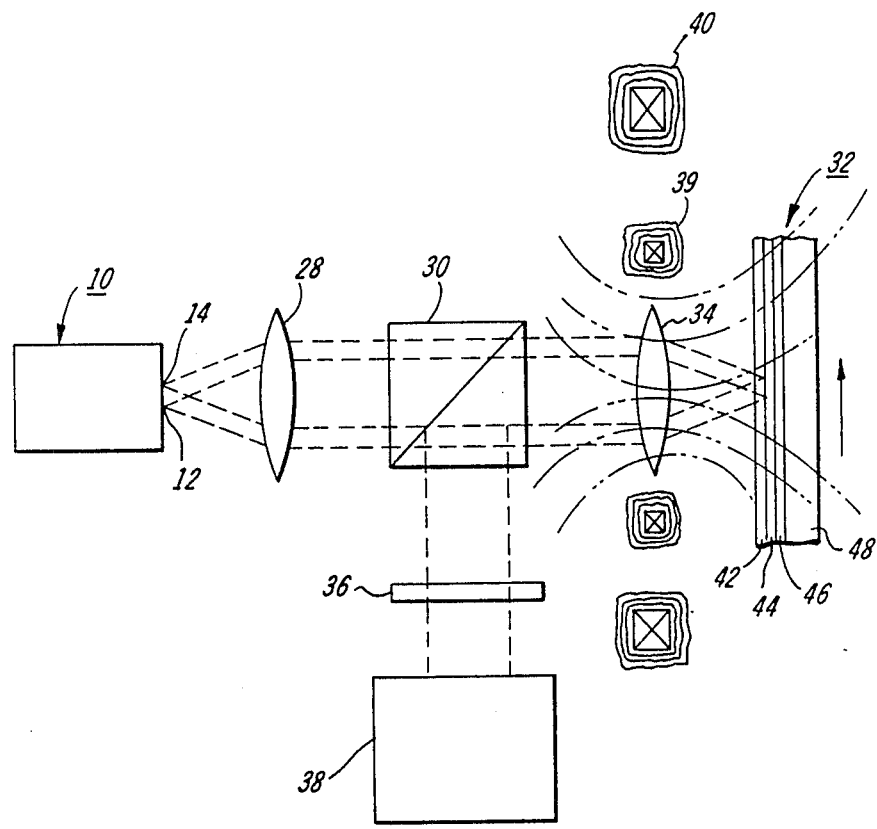
FIG. 2 is a side elevation view of the dual laser system of FIG. 1 showing the known magnetization means.

In FIG. 2, the typical magneto-optic writing and erasing electromagnetic coil 40 is shown adjacent the recording medium 32 for establishing a magnetic field having a substantially vertical component therethrough. Such an arrangement has several major limitations. First, the electromagnetic coil 40 cannot be located sufficiently close to the medium to prevent a rapid dropoff in field intensity. The field intensity reduces proportionally with the inverse of the cube of the distance from the coil. Given the usual distance between the coil and the recording medium a tenfold reduction of field intensity is easily possible. Thus, if a 500 Oersted (Oe) field is required for changing the magnetic state of an addressed domain, a magnetic field of about 5000 Oe may have to be generated. It should be clear that the necessarily high magnetic field could adversely affect both focussing and tracking. In present commercial applications, expensive shielding is put in place. Also, the higher field will require a more expensive power supply. Second, the field lines are not disposed in a true perpendicular orientation in the vicinity of the focused laser spot; and third, switching of the field, to reverse the direction of the field lines, is slow due to inductance from the field coils.

The second limitation has been somewhat ameliorated in the teaching of German Patent document OLS 3,009,978 entitled "Magnetic Information Recording and Reproducing Apparatus," assigned to Olympus Optical K.K., having a publication date of Sept. 18, 1980. In that document, a flux concentrating member in the form of a soft iron member is introduced on the side of the medium opposite the electromagnetic coil in an attempt to bring the field lines closer to a true perpendicular orientation. In sum, the major drawbacks of the typical magneto-optic writing and erasing system, utilizing an electromagnetic coil, as shown in FIG. 2, are the required high magnetic field (approximately 5000 Oe) which increases the cost of field generation and field shielding, and the switching time lag when it is desired to change the direction of the bias field from UP ( ↑ ↑ ↑ ) to DOWN ( ↓ ↓ ↓ ), and vice versa.

The recording medium illustrated in FIG. 2 includes an overlayer 42, a magnetic layer 44 having perpendicular anisotropy, a reflector layer 46 and a substrate 48. In its preferred form, the magnetic layer 44 comprises any ferrimagnetic material such as the rare-earth, transition metals TbFe, DyFe, DyCo or mixtures of several of these, such as TbFeCo.

Figure 3:
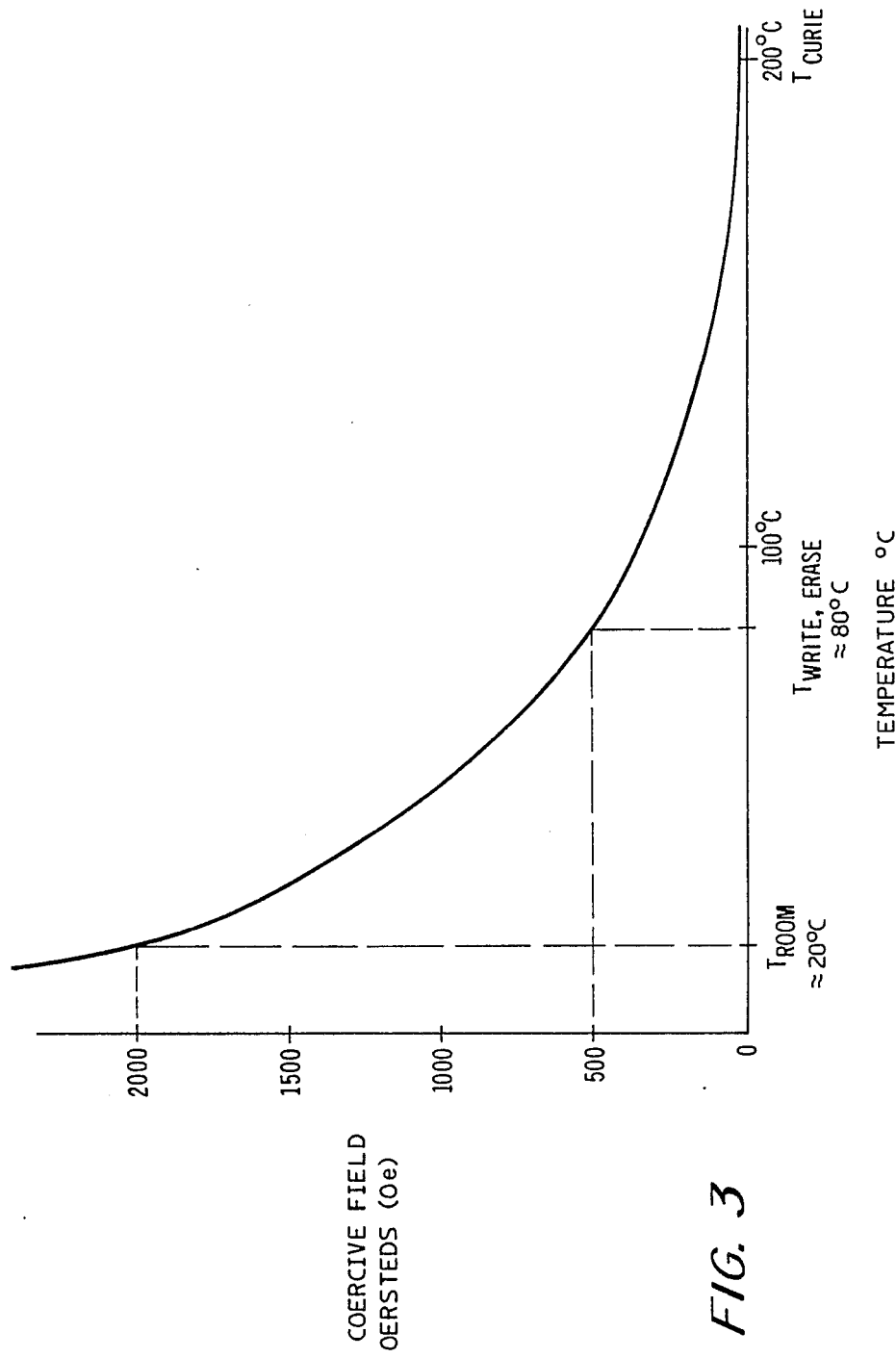
FIG. 3 is a graph showing the relationship between coercieve field and temperature acting upon a magneto-optic recording medium.

Magneto-optic recording relies upon changing the state of a small region (domain) of the recording medium which has been heated to a requisite temperature in the presence of an external magnetic field of sufficient magnitude. This phenomenon is clearly illustrated in FIG. 3 which plots the relationship between coercive field and temperature for causing such changes in magnetic orientation with standard thermomagnetic materials. It can be seen that at room temperature (about 20° C.) a coercive field on the order of 2000 Oe is needed to cause a transition, while at the Curie temperature of about 200° C. the medium will loose its magnetic action. At the writing and erasing temperature of about 80° C. a coercive field of about 500 Oe would be required.

Figure 4:
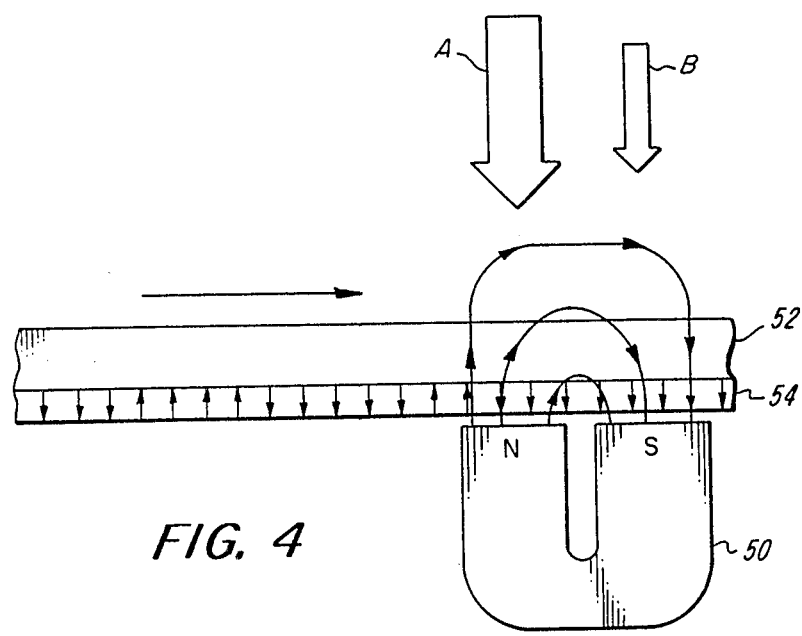
FIG. 4 is a schematic representation of the magnetization means of the present invention in the preferred second surface writing orientation, showing the read after write mode.
Figure 5:
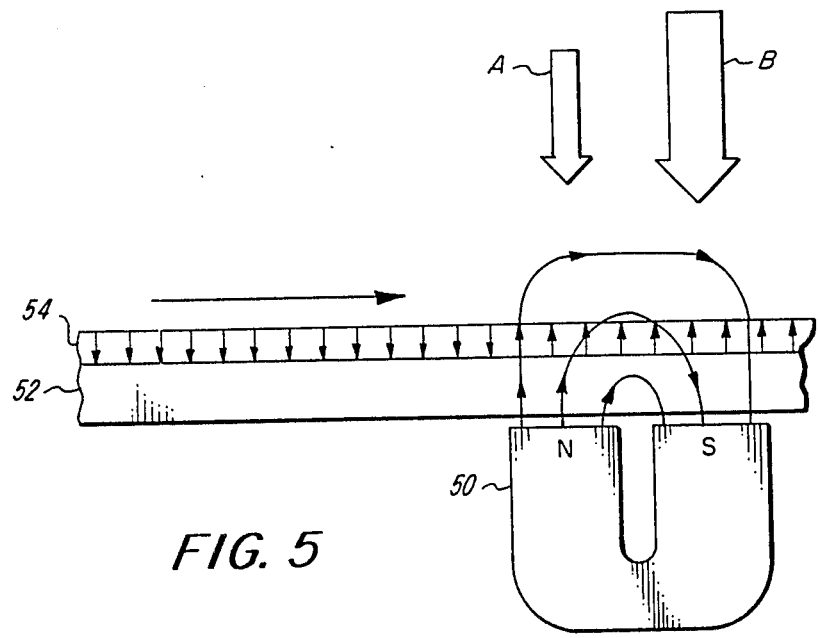
FIG. 5 is a schematic view similar to that of FIG. 4, showing a first surface writing orientation in the read before erase mode.
Figure 8:
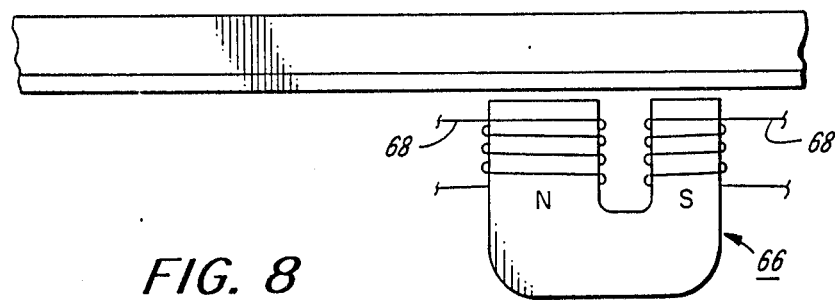
FIG. 8 is a schematic view similar to FIG. 6, showing another form of electromagnet designed for enhanced erasing characteristics.
Figure 9:
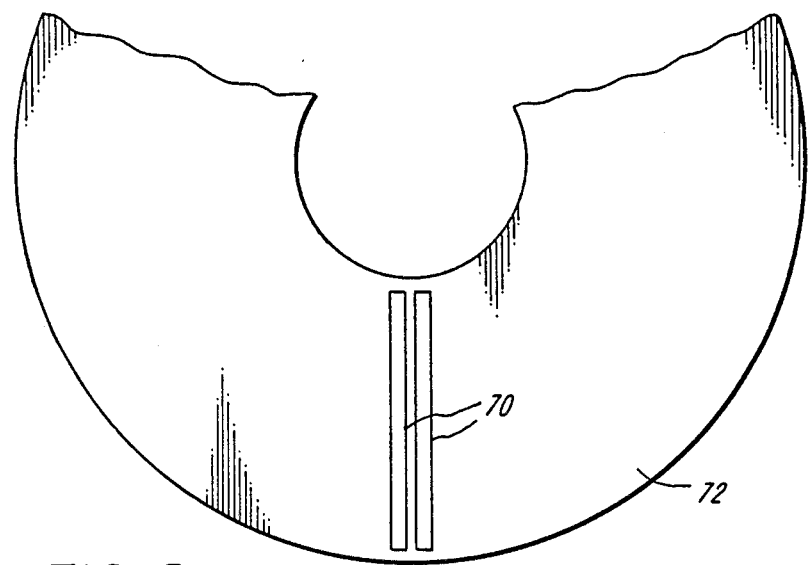
FIG. 9 is a plan view showing the orientation of the magnet to the recording medium, in one form,`

In the present invention, as illustrated in FIGS. 4 and 5, no switching of the magnetic field is required. Opposite unipolar magnetic pole pieces, spaced from one another by about 100 microns, are located adjacent to the side of the recording medium opposite the optical system, spaced therefrom by about 10 microns. The poles may be those of a permanent horseshoe magnet 50, the ends of parallel permanent magnets (not shown), or the pole pieces of an electromagnet (FIGS. 8 and 9). Since the magnets may be held in extremely close proximity to the recording medium there is very little loss of the magnetic field. In order to obtain a usable magnetic field of about 500 Oe at the recording medium, the magnets would have to generate approximately that amount. Furthermore, as the field would drop off by about a factor of ten (50 Oe) at the vicinity of the focusing and tracking magnetic means, there will be no magnetic interference with those devices. Shielding could be eliminated, along with its attandant costs. Another advantage of the present system is that almost all usable components of the magnetic field will be substantially perpendicular to the recording medium.

Typically, there is an aversion to the use of permanent magnets in magneto-optic systems, since the magnetic recording medium would be under the influence of the magnetic field at all times. However, as used in the present invention, the relatively low magnetic field will have no adverse effects on the stored information. In the short term, it is very unlikely that any transition inducing combination of temperature and coercive field conditions would exist at other than the writing and erasing conditions shown in FIG. 3. Therefore, the medium would be extremely stable. In the long term, the effect of a continuous 500 Oe field would probably cause earlier failure than would the switchable electromagnet illustrated in FIGS. 8 and 9. To avoid early failure, it is suggested that a conventional loading mechanism could easily be incorporated for moving the permanent magnets to a location remote from the medium.

A simple bilayer recording medium configuration is illustrated in FIGS. 4 and 5 which show two system configurations, each having its benefits and detriments. The recording medium comprises a substrate layer 52 (about 1 to 2 mm), made of glass, PMMA, or other suitable material upon which is supported a thin ferrimagnetic magneto-optic layer 54 (about 200 to 300 A). The preferred second surface writing situation is illustrated in FIG. 4 wherein the medium is oriented so that the laser beams first pass through the substrate, which would have to be opitcally transparent, before acting upon the magneto-optic layer. The magnet 50 would be held about 100 microns from the magneto-optic layer.

A somewhat less desirable orientation is illustrated in FIG. 5. In this first surface writing situation, the laser beam will first encounter the ferrimagnetic magneto-optic layer 54 and the magnet 50 will be held close to the substrate. Advantages of this system are that there will be a greater latitude for choice of substrate material since it need not be optically transparent and the system will be mechanically more rugged since there will be less concern about marring the magneto-optic layer by a magnetic head crash. The main disadvantage, of course, is the rapid drop off of the magnetic field.

Maintaining the magnets very close to the recording medium as it is rapidly rotated may be accomplished by mounting them and designing them in such a way as to establish an air bearing between the pole pieces and the medium. If desired, the pole pieces and medium could be maintained a desired fixed distance from one another by incorporating a known capacitive servo system, which fixes the distance electrically by continuously monitoring the capacitance between the metal of the magneto-optic layer 54 and the metal of the magnet 50.

A discussion of the improved operation will follow. By convention herein, the recording medium, in the form of a rotatable disk, will have an overall magnetization, perpendicular to the plane of the disk, in a downward direction ( ↓ ↓ ↓ ) as viewed in FIGS. 4 and 5. Also by convention herein, magnetic field lines pass from North ( ↑ ↑ ↑ ) pole piece to South ( ↓ ↓ ↓ ) pole piece. In the "write" mode an upward ( ↑ ↑ ↑ ) magnetization will be imposed on selected information domains of the medium, in the "erase" mode the written information domains will be returned to the downward magnetization, and in the "read" mode the direction of magnetization will be identified in a known manner by means of the reflection optics and the detector circuit. Writing and erasing are both accomplished by the application of sufficient optical energy to the selected information domain, by means of operating the appropriate laser (i.e. relative to the proper pole piece) at high power.

In other words if it is desired to write, as shown in FIG. 4, laser A associated with the North pole, is operated at a high power to impose an upward domain in the medium. Conversely if it is desired to erase, as shown in FIG. 5, laser B associated with the South pole is operated at high power, to impose a downward domain in the medium. For reading, low power is sufficient as indicated by the relative size of arrows A and B in FIGS. 4 and 5. A GaAs laser driven at about 5 to 10 mW (high) could be used for both writing and erasing, and could be driven at about 0.1 to 1 mW (low) for reading. Either of the two lasers, when operated at low power, may also used for reading. Real time reading after writing or reading before erasing is thus easily achievable. In these modes, there is not sufficient thermal energy to change the magnetic state of the medium, in spite of the 500 Oe magnetic field acting upon it.

A bi-laser could be made to project two spots, each about 1 micron in diameter, about 100 microns apart, upon the same track of a recording disk, one leading and one trailing. Thus, each spot will be disposed in the region of one of the magnetic pole pieces where the magnetic field is about 500 Oe UP ( ↑ ↑ ↑ -North) or DOWN ( ↑ ↑ ↑ -South). Radial movement of the disk relative to the optical path will cause the spots to move from track to track. As either of the lasers is operated at high power, it will cause the magnetic medium to be sufficiently heated so that it may be magnetically written upon. In this manner, one can easily and rapidly "switch" the magnetization of a selected information domain on the medium from UP to DOWN, or vice versa, simply by selecting the appropriate laser and pulsing it at high power. Alternatively, the selected laser may be operated in a CW mode, as for example erasing entire tracks at one time, or writing in a transition mode, rather than bit-by-bit. As described above, an information bit ("1") may be written by pulsing the laser associated with the North ( ↑ ↑ ↑ ) pole piece. Of course, it is also possible to achieve a more dense information load on the medium by "writing" and reading transitions as "1's" rather than identifying the orientation of individual domains. For example, in a track of all "0"s ( ↓ ↓ ↓ ), when it is desired to write a "1", the laser associated with the North pole piece would be energized at high power to create a transition. The laser would be operated CW until the next "1" is to be written, at which time the laser would be extinguished.

Figure 6:
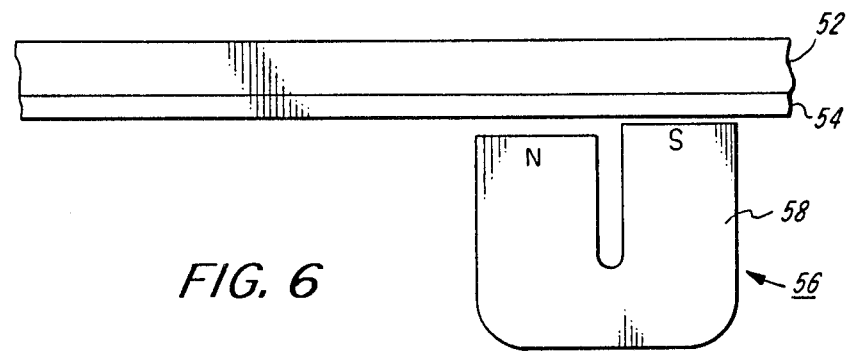
FIG. 6 is a schematic view similar to FIG. 4, showing a modified permanent magnet designed for enhanced erasing characteristics.
Figure 7:
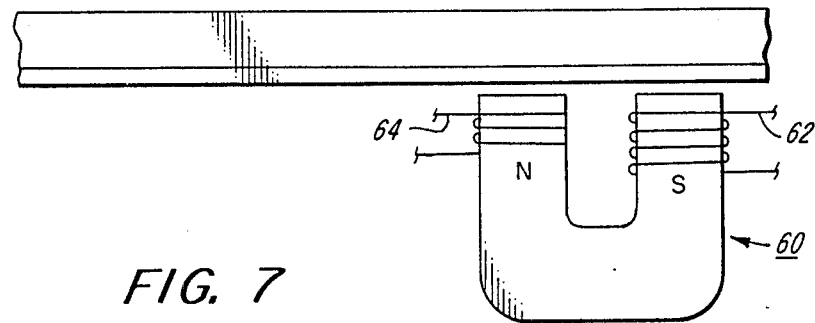
FIG. 7 is a schematic view similar to FIG. 6, showing one form of electromagnet designed for enhanced erasing characteristics.

When erasing it is important that the entire domain be returned to the direction of the overall magnetization. To this end, the erase domain should be larger than the write domain. Clearly this can be accomplished in any of several ways. For example, in the erase mode the laser may operated at a higher power (e.g. 10 to 20 mW) to generate a larger spot. Alternatively, the laser may be pulsed for a longer period, such as 20 ns rather than the usual 10 ns. By far the presently preferred method is to increase the magnetic field of the erase pole as shown in FIGS. 6, 7 and 8. In FIG. 6, permanent magnet 56 has its South, erase, pole 58 extending closer to the recording medium. In FIG. 7, an electromagnet 60 has more South pole windings 62 than North pole windings 64. In FIG. 8, electromagnet 66 has the same number of windings 68 on North and South poles, but South pole is shaped to increase the magnetic field.

It will be apparent that magneto-optic recording accomplished in accordance with the above described apparatus has several major advantages as compared with known magneto-optic recording techniques. The optical portion of the system and the magnetic field portion are designed to enhance one another to yield substantial flexibility of operations in a rapid and simple manner. Clearly the magnetic portion itself is considerably simpler than known switchable electromagnetic coils.

Figure 10:
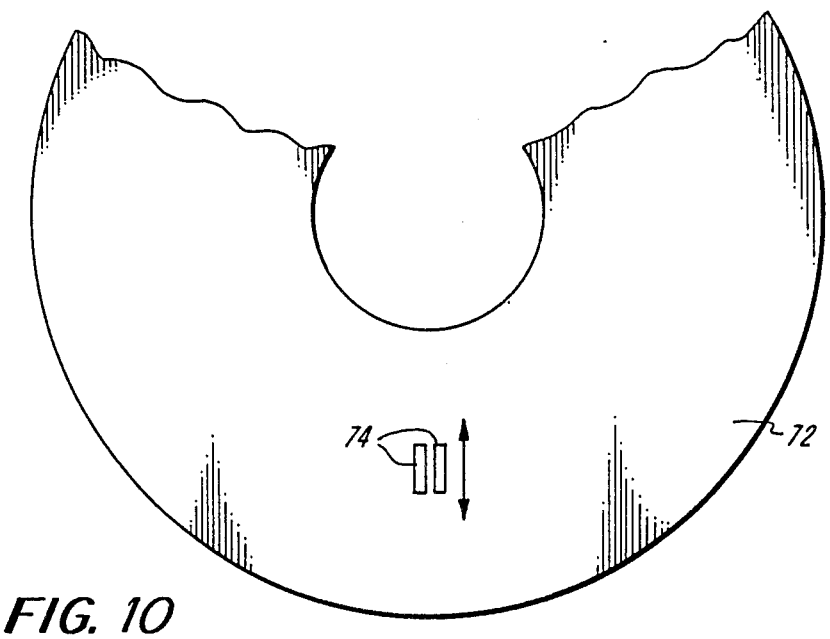
FIG. 10 is a plan view similar to FIG. 9 showing the orientation of the magnet to the recording medium, in another form.

The magnetic means will normally extend across a number of tracks as illustrated in FIGS. 9 and 10. The magnetic means 70 in FIG. 9 crosses all the tracks of the recording disk 72. Therefore no movement of the magnetic means will be necessary. The magnetic means 74 of FIG. 10 could easily be on the order of 300 microns long and would cross several, but not all, the tracks. Therefore, some support and drive means would have to be provided to move it radially relative to the disk 72, as shown by the arrow.

Figure 11A:
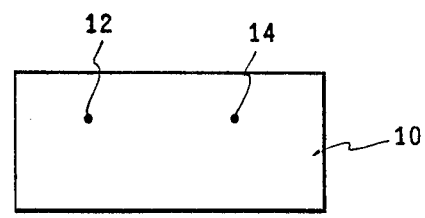
FIG. 11a is a schematic front elevation view of a bi-laser optical input device for use with the present invention.
Figure 11B:
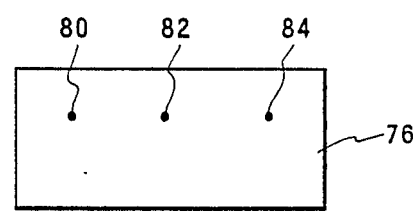
FIG. 11b is a view similar to that of FIG. 11a, showing a tri-laser optical input device.
Figure 11C:
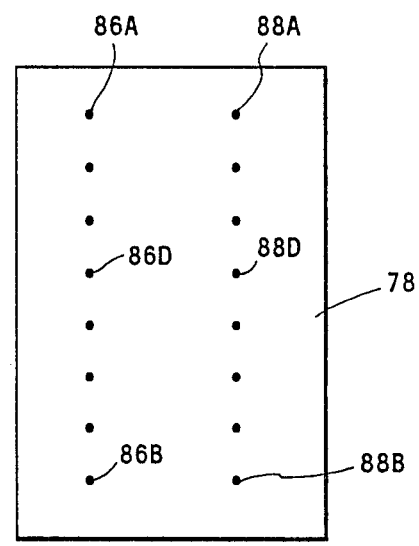
FIG. 11c is a view similar to that of FIGS. 11a and 11b, showing a 2×8 multi-laser optical input device.

Another decided advantage of the present invention is the capability of using arrays of diode lasers, including any number of lasers side by side, with the same magnetic means. In FIGS. 11a, 11b and 11c there are schematically illustrated the bi-laser 10 described above, a tri-laser 76 having particular advantage for use in known tracking schemes, and a 2×8 multi-laser matrix array 78. The tri-laser 76 would be positioned relative to the medium so that the three lasers 80, 82 and 84 all project upon a single track. In the tracking mode they are each operated at low power, and cooperate with a detector circuit designed to indicate proper tracking by the intensity of the signal received. Outboard lasers 80 and 84 will be addressable for writing and erasing as described above. The multi-laser matrix array 78 (86a–h and 88a–h) is capable of simultaneously and individually addressing eight tracks (equivalent to the output of conventional 8-bit computers) while still deriving the described advantages of the plural on-track lasers. It is believed that the single optical path could accommodate all of the closely spaced laser beams of this matrix array. It would also be possible to fabricate a diode laser matrix array of 32 spots (rather than eight) so as to simultaneously record the output of presently available 32-bit computers. Even such an array, of 32 spots, would probably have a lateral dimension of about 30 to 40 microns and would fall within the area covered by either the fixed magnets of FIG. 9 or within the smaller area covered at a given location by the movable magnets of FIG. 10.

While the invention has been particularly shown and described with reference to several embodiments thereof, it will be understood by those skilled in the art that various changes in the form and details may be made without departing from the spirit and scope of the invention.

What is claimed is:

1. A magneto-optic recording apparatus for providing information input to a magneto-optic recording medium having a number of tracks, characterized by including
plural laser means,
laser driver means capable of selectively and independently addressing each of said lasers,
optical system means interposed between said plural laser means and said magneto-optic recording medium for focusing said plural laser beams on at least one track of said medium, and
magnet means, located on the side of said medium opposite to said optical system means, including spaced pole pieces of opposite polarity positioned adjacent said medium with one of said laser means being associated with one of said pole pieces and another of said laser means being associated with the other of said pole pieces.

2. The magneto-optic recording apparatus as defined in claim 1 characterized in that said laser driver means may be operated at a first state for driving a selected one of said lasers at a first energy level, wherein the optical energy output of said energized laser is sufficient to heat an addressed domain of said medium for allowing its related magnetic pole piece to affect the magnetization state of said domain, and said driver means may be operated at a second state for driving a selected one of said lasers at a second energy level, wherein the optical energy output of said energized laser is insufficient to heat an addressed domain of said medium for allowing its related magnetic pole piece to affect the magnetization state of said domain.

3. The magneto-optic recording apparatus as defined in claim 2 characterized in that said optical system means includes deflection means for redirecting a laser beam reflected from said medium and detection means for sensing characteristics of said laser beam, whereby the information recorded on said medium may be read.

4. The magneto-optic recording apparatus as defined in claim 3 characterized in that said laser means comprises a solid state laser array including a first laser and a second laser, wherein each of said first and second lasers are associated with one of said opposite polarity magnetic pole pieces.

5. The magneto-optic recording apparatus as defined in claim 3 characterized in that said laser means comprises a solid state laser array including a first laser, a second laser and a third laser, wherein each of said first and second lasers are associated with one of said opposite polarity magnetic pole pieces.

6. The magneto-optic recording apparatus as defined in claim 5 characterized in that said third laser is positioned between said first laser and said second laser.

7. The magneto-optic recording apparatus as defined in claim 3 characterized in that said laser means comprises a solid state laser array including plural lasers positioned to focus upon each of several tracks on said recording medium.

8. The magneto-optic recording apparatus as defined in claim 1 characterized in that said magnet means comprises a permanent magnet.

9. The magneto-optic recording apparatus as defined in claim 1 characterized in that said magnet means comprises an electromagnet.

10. The magneto-optic recording apparatus as defined in claim 1 characterized in that said recording medium is a rotatable disk and said magnet means extends from the innermost track to the outermost track of said disk in a substantially radial direction.

11. The magneto-optic recording apparatus as defined in claim 1 characterized in that said recording medium is a rotatable disk and said magnet means extends over less than all the tracks in a substantially radial direction, and further including means for moving said magnet means in a substantially radial direction between said innermost track and said outermost track.

12. A magneto-optic recording apparatus for providing information input to a magneto-optic recording medium having a number of tracks, wherein the medium has an overall magnetization in a first direction, normal to its planar dimension, and the information input comprises magnetization in a second direction opposite to said first direction, characterized by including plural laser means,
laser driver means capable of selectively and independently addressing each of said lasers,
optical system means interposed between said plural laser means and said magneto-optic recording medium for focusing said plural laser beams onto at least one track of said medium,
magnet means, located on the side of said medium opposite to said optical path means, including spaced pole pieces of opposite polarity positioned adjacent said medium with one of said laser means being associated with one of said pole pieces and another of said laser means being associated with the other of said pole pieces, one pole piece being used with its associated laser during writing for creating areas of said medium in said second direction and the other pole piece being used with its associated laser during erasing for creating areas on said medium in said first direction, and
means for causing said first direction areas to be larger in area than said second direction areas.

13. The magneto-optic recording apparatus as defined in claim 12 characterized in that said laser means is capable of selectively and independently addressing each of said lasers at a first energy level, wherein the optical energy output of said energized laser is sufficient to heat an addressed domain of said medium for allowing its related magnetic pole piece to affect the magnetization state of said domain, and at a second energy level, wherein the optical energy output of said energized laser is insufficient to heat an addressed domain of said medium for allowing its related magnetic pole piece to affect the magnetization state of said domain.

14. The magneto-optic recording apparatus as defined in claim 12 characterized in that said means for causing said first direction domains to be larger in area than said second direction domains comprises providing a higher magnetic field from said other pole piece than from said one pole piece.

15. The magneto-optic recording apparatus as defined in claim 14 characterized in that said other pole piece is located closer to said recording medium than said one pole piece.

16. The magneto-optic recording apparatus as defined in claim 14 characterized in that said magnet means is an electromagnet and said other pole piece has more windings than said one pole piece.

17. The magneto-optic recording apparatus as defined in claim 14 characterized in that said magnet means is an electromagnet, said pole pieces have the same number of windings, and said other pole piece is shaped relative to said one pole piece.

18. The magneto-optic recording apparatus as defined in claim 17 characterized in that said other pole piece is of smaller cross-sectional area than said one pole piece.

19. The magneto-optic recording apparatus as defined in claim 12 characterized in that said means for causing said first direction domains to be larger in area than said second direction domains comprises causing said laser driver means to energize said laser associated with said one pole piece at said first energy level and to energize said laser associated with said other pole piece at a third energy level, said third energy level being higher than said first energy level.

20. The magneto-optic recording apparatus as defined in claim 12 characterized in that said means for causing said first direction domains to be larger in area than said second direction domains comprises causing said laser driver means to energize said laser associated with said other pole piece for a longer period of time than that at which said laser associated with said one pole piece is driven.

* * * * *